Patented Jan. 8, 1952

2,581,402

UNITED STATES PATENT OFFICE 2,581,402

STABILIZED REDOX COMPOSITIONS

Charles F. Fryling, Phillips, Tex., assignor to Phillips Petroleum Company, a corporation of Delaware No Drawing. Application April 24, 1947, Serial No. 743,717

14 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

Numerous recipes have been developed for carrying out emulsion polymerization reactions to yield products possessing rubber-like characteristics. Certain advantages have been achieved through the use of catalyst systems comprising selected combinations of oxidizing and reducing agents, which together with an oxidation-reduction catalyst, serve as initiators of polymerization. These combinations are frequently referred to as redox systems and comprise an oxidant, such as an inorganic or organic peroxide, per-nitrate, permanganate, persulfate, etc., a reductant such as a sugar, a bisulfite compound, sodium thiosulfate, a ketone, a ferrous salt, etc., and an oxidation catalyst comprising a compound of a metal, such as iron, manganese, copper, vanadium, cobalt, silver, etc. The metal compound may be in the form of a complex, such as a porphyrin. In general it is assumed that the metal element must be in such a condition that it can change its valence state reversibly. For an example, iron is suggested. This metal can pass readily from the two-valent ferrous state to the three-valent ferric state and vice versa, by simply losing (or gaining, to go in the reverse direction) a valence electron. It is also evident that a compound such as ferrous sulfate might combine the dual role of a reductant and an oxidation catalyst.

One commonly used redox catalyst is iron pyrophosphate. In a redox system comprising hydrogen peroxide and organic mercaptan, used as oxidant and reductant respectively, ferric pyrophosphate, prepared by addition of a ferric salt to an aqueous solution of sodium pyrophosphate, has been found to be a useful catalyst. With another class of redox systems, comprising cumene hydroperoxide (phenyl (dimethyl) hydroperoxymethane) and sugar, ferrous pyrophosphate has been found to be more effective as a catalyst, as is more fully discussed in Kolthoff application Serial No. 751,955, filed June 2, 1947. However, ferric pyrophosphate can also be used.

When carrying out a polymerization with this latter system, certain difficulties are encountered. For example, if the catalyst is prepared in the form of a so-called "activator" solution by adding ferrous sulfate to an aqueous solution of sodium pyrophosphate, the solution must be used immediately, otherwise oxidation by the atmosphere destroys its potency. Impurities in the water, such as calcium salts, etc., likewise are deleterious. If the concentration of ferrous ion added to the system is greater than the concentration of the cumene hydroperoxide, i. e., if there is present more than one gram, or milligram, ion of ferrous ion per gram, or milligram, molecule of cumene hydroperoxide, no polymerization occurs. The excess of cumene hydroperoxide required for optimum operating conditions over the mol ratio of one to one is so little that slight errors in measurement of these ingredients can easily cause great differences in the rate of polymerization and in the extent to which polymerization proceeds. However, it should be emphasized that if care is exercised in preparing the activator solution, consistent and high rates of polymerization can be obtained.

In preparing activator solutions, a ferrous or ferric salt is added to a solution of sodium pyrophosphate. Ferrous and ferric pyrophosphate are formed by metathesis and these compounds combine further to form pyrophosphate complexes, such as the well known soluble ferric pyrophosphate, $Fe_4(P_2O_7)_3 \cdot 3Na_4P_2O_7 \cdot xH_2O$. For this reason it has become customary to speak of ferrous pyrophosphate and ferric pyrophosphate activators without specifying the source of the ferrous or ferric ions, that is, whether derived from ferrous sulfate or some other salt, and without specifying to what extent the resulting pyrophosphates have been complexed. It can be mentioned that the aforementioned "soluble ferric pyrophosphate" has been found to be a very convenient source of ferric ions for the preparation of ferric activators.

With ferrous pyrophosphate, a molecular excess of cumene hydroperoxide with respect to ferrous ion must be present to obtain any polymerization. With ferric pyrophosphate, on the other hand, this limitation is absent and polymerization can be conducted with amounts of cumene hydroperoxide which are much lower than are required with an equivalent concentration of ferrous salt. However, under the best attainable conditions the rate of polymerization is never faster than about 67 per cent of what can be obtained with ferrous pyrophosphate.

It might be thought that a mixture of ferrous and ferric salts would possess certain advantages and such indeed has been found to be the case. With such mixtures the limiting ratio of cumene hydroperoxide to iron can be lowered without adversely affecting the high rates of polymerization obtainable with ferrous pyrophosphate activation.

I have now found that by preparing a mixed ferrous-ferric pyrophosphate activator by heating in the absence of air a mixture of a pyrophosphate of an alkali metal, such as sodium pyrophosphate, soluble ferric pyrophosphate (any one of a number of other soluble ferric salts can be used, as subsequent runs have shown) water, and a reducing sugar such as glucose, there results a preparation of an activator solution with entirely new and unexpected properties. The absence of free oxygen is insured by boiling the solution in a narrow-necked flask. The activator solution so prepared, instead of exhibiting properties of a mixed ferrous-ferric system, as might be expected, initiates polymerization reactions which are considerably more rapid than have previously been obtained with ferrous pyrophosphate, does not exhibit a limiting 1:1 molar ratio of cumene hydroperoxide to iron content, and is found to retain its activity over a period of days. Without wishing to be held to the literal exactness of the following theoretical speculations, I believe that the ferrous content of this heated activator solution is more rapidly converted to the ferric state, and vice versa, by exposure to air and to other oxidizing or reducing agents. This may be the result of forming more stable complexes with the pyrophosphate, sugar oxidation products (levulinic acids) may lend themselves to more rapid oxidation and reduction, or even a complex analogous to glycero phosphates may be formed.

The activator solution is heated at an elevated temperature and held there for a period of about 5 to 60 minutes. Preferably it is heated at atmospheric pressure to boiling and is then boiled for a period of about one hour or less, and preferably from about 15 to about 30 minutes. The amount of soluble ferric pyrophosphate in the activator solution will not usually exceed about one part per 100 parts of monomeric material charged, and will frequently be in the range from about 0.10 to about 0.35 part. Sodium pyrophosphate, or pyrophosphate of an alkali metal, is present in the concentration range of about 0.5 to about 3 parts per 100 parts of monomeric material. In cases where ferric chloride or sulfate is employed, instead of the soluble ferric pyrophosphate, a correspondingly larger quantity of sodium pyrophosphate may be used when preparing the activator solution. Reducing sugars, such as glucose, levulose, sorbose, d-ribose, invert sugar, and the like may be used in preparing the "boiled" activator solution, in a concentration range of about 1 to about 4 parts per 100 parts of monomeric material.

The monomeric material polymerized to produce synthetic rubber by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene, and the like; haloprenes, such as chloroprene, (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinylidene chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

Another object of this invention is to provide a novel catalyst composition.

A still further object of this invention is to provide improved redox compositions.

Another object of this invention is to provide stable redox compositions.

Other objects and advantages of this invention will become apparent, to one skilled in the art, from the accompanying disclosure and discussion.

The "boiled" or reduced activator solutions herein described can be employed as components of numerous redox catalyst systems. For example, these new activator solutions are advantageous in systems wherein the oxidizing agent is a peroxidic-type material, such as hydrogen peroxide, benzoyl peroxide, cumene hydroperoxide, potassium persulfate, sodium perborate, etc., or a compound which functions in the capacity of an oxidizing agent, or decomposes to generate free radicals such as an oil-soluble diazo thioether, the use of which is described in a previous application by W. B. Reynolds and E. W. Cotten, Serial No. 641,866, filed January 17, 1946, now Patent 2,501,692, granted March 28, 1950. Suitable diazo thioethers include oil soluble compounds which have the general formla R—N=N—S—R' where R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. Various preferred compounds are more fully described in said application of Reynolds and Cotten, Serial No. 641,-866, filed January 17, 1946, now Patent 2,501,692, and include those represented by the formula:

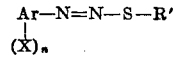

where Ar is an aryl group and X is a substituent selected from the group consisting of alkyl, alkoxy, aryl and aryloxy radicals, $n$ is an integer from one to four; and R' is a member of the group consisting of aromatic, substituted aromatic, cycloalkyl, substituted cycloalkyl, aliphatic, and substituted aliphatic radicals. Specific examples are the following: 2-(p-methoxybenzenediazomercapto) naphthalene, 2-(2,4-dimethylbenzenediazomercapto) naphthalene, 4-(2,4-dimethylbenzenediazomercapto) anisole, and the like. Some of the more important compounds may be conveniently represented by the formula:

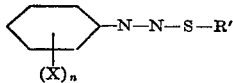

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

The amount of diazo thioether used in the present process will generally range from about 0.05 to about 2.0 parts per 100 parts of monomers. The amount is governed by the operating temperature, the quantities of the other catalytic materials present, and the type of product desired.

The mercaptans suitable for use in this invention comprise those of primary, secondary, and tertiary configuration containing from four to twenty carbon atoms per molecule with those containing from six to sixteen carbon atoms per molecule being most generally preferred. While tertiary mercaptans are most widely used and in many cases are most desirable, primary and secondary mercaptans are sometimes advantageous. It is also frequently preferred to employ blends of mercaptans such as, for example, blends of tertiary $C_{12}$, $C_{14}$, and $C_{16}$ mercaptans.

The quantity of mercaptan employed will vary depending upon the molecular weight and purity of the material as well as upon the results desired. For example, when tertiary $C_{12}$ mercaptan is used, the amount generally varies within the range of about 0.05 to about 1.40 parts per 100 parts of monomers charged, with the narrower range of about 0.10 to about 0.45 part being most frequently preferred.

When operating according to the method of this invention temperatures may range from about —30 to about 70° C. with temperatures from about —10 to about 20° C. usually preferred. Obviously when polymerizations are carried out in the absence of aqueous emulsion, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

*Example I*

An activator solution was prepared by boiling the following ingredients in the absence of air for 30 minutes:

| | Grams |
|---|---|
| Sodium pyrophosphate | 10.0 |
| Soluble ferric pyrophosphate complex | 1.8 |
| Glucose | 10.0 |
| Water to make 100 ml. | |

The activator prepared as described above was employed in the following cumene hydroperoxide-redox recipe:

| | Parts by weight |
|---|---|
| Butadiene | 72 |
| Styrene | 28 |
| Potassium oleate (pH 10) | 5.0 |
| Water | 180 |
| Tertiary mercaptan blend [1] | 0.4 |
| Sodium pyrophosphate } | 1.0 |
| Ferric pyrophosphate } Activator [2] solution | 0.18 |
| Glucose } | 1.0 |
| Cumene hydroperoxide | 0.2 |

[1] A blend of tertiary $C_{12}$, $C_{14}$, and $C_{16}$ mercaptans in a ratio of 3:1:1 parts by weight.
[2] The activator solution was employed in such quantity as to furnish the amount of each ingredient listed.

Polymerization was effected in the usual manner while the temperature was held at 15° C. At the end of a 2.5-hour reaction period conversion had reached 34 per cent. A similar run was carried out using the same recipe except that 0.10 part ferrous sulfate ($FeSO_4.7H_2O$) was used without heating in place of the ferric pyrophosphate boiled activator. A conversion of only 24 per cent was attained after 2.5 hours.

Example II

An activator solution was prepared by boiling, in the absence of air, 10.0 grams sodium pyrophosphate, 1.8 grams soluble ferric pyrophosphate complex, 20.0 grams glucose, and enough water to make 100 ml. of solution. Boiling was continued for 30 minutes after which 10 ml. of the activator solution was used immediately in the following polymerization recipe:

| | |
|---|---|
| Butadiene _____grams__ | 72 |
| Styrene _____do____ | 28 |
| Potassium oleate (pH-10) _____do____ | 5.0 |
| Water _____do____ | 180 |
| Tertiary mercaptan blend[1] _____do____ | 0.4 |
| Cumene hydroperoxide _____do____ | 0.2 |
| Activator solution _____ml__ | 10 |

[1] Blend as in Example I.

Polymerization was carried out at 15° C. using the conventional technique. After four hours a conversion of 39.0 per cent was reached. A similar run was performed using the same quantity of activator solution that had been allowed to stand five days. After a four-hour polymerization period the conversion obtained was 43.3 per cent.

Example III

The effect of time of heating of the activator solution on conversion was studied. The activator was prepared as in Example II except that the period of heating was varied. A series of polymerization experiments was carried out using the recipe of Example II. The following tabulation shows the per cent conversion after a four-hour polymerization period using different samples of the activator:

| Time of Heating, Minutes | Conversion at 4 Hours, Per Cent |
|---|---|
| 5 | 32.4 |
| 15 | 38.1 |
| 30 | 39.0 |
| 60 | 38.3 |

Example IV

Activators were prepared using different sugars as the organic reducing component. The activators were prepared by boiling 30 minutes, in the absence of air, 10.0 grams sodium pyrophosphate, 1.8 grams soluble ferric pyrophosphate, 30.0 grams of the sugar, and enough water to make 100 ml. of solution. These activators were used in polymerizations at 15° C. following the recipe given in Example II. The data obtained are shown below:

| Sugar | Conversion, Per Cent— | |
|---|---|---|
| | 4 hours | 28 hours |
| Glucose_____ | 42.1 | 85.5 |
| Levulose_____ | 46.7 | 86.0 |
| Sorbose_____ | 40.6 | 80.0 |

These results show an increase in conversion rate of approximately 50 per cent over that obtained when similar runs were carried out in which ferrous sulfate was employed as a catalyst in place of the reduced ferric pyrophosphate activator.

Example V

The effect of varying the amount of ferric pyrophosphate employed in the preparation of reduced activator solutions was determined by preparing a series of activators and using them in the cumene hydroperoxide-redox recipe given in Example II. The activators were prepared from 10.0 grams sodium pyrophosphate, variable amounts of ferric pyrophosphate, 30.0 grams glucose, and enough water to make 100 ml. The mixture in each case was boiled in the absence of air for 30 minutes and then used in the polymerization experiment which was carried out at 15° C. The conversion data at 4 hours and 28 hours, respectively, obtained when different amounts of ferric pyrophosphate were used are shown below:

| Ferris Pyrophosphate Parts/100 parts monomers | Conversion, Per Cent— | |
|---|---|---|
| | 4 hours | 28 hours |
| 0 | 0.2 | 45.1 |
| 0.05 | 35.4 | 83.5 |
| 0.10 | 35.5 | 83.5 |
| 0.18 | 42.1 | 85.5 |
| 0.25 | 41.3 | 87.1 |
| 0.30 | 41.3 | 83.6 |
| 0.40 | 47.1 | 78.5 |

In a series of similar runs using ferrous sulfate in place of reduced ferric pyrophosphate, an equivalent increase in the ferrous sulfate resulted in substantially complete suppression of the reaction.

In another series of runs samples of the iron pyrophosphate activator compositions prepared above were allowed to stand four days during which period no effort was made to protect the solutions from air or light. When used in the cumene hydroperoxide-redox polymerization recipe at 15° C. as employed above, only a very slight decrease in conversion rate was observed.

Example VI

Two series of runs were conducted to show the difference between results obtained by the old procedure using ferrous sulfate heptahydrate, 0.15 part, with 1.00 part of levulose and the new procedure using a reduced activator solution prepared from an equivalent amount of soluble ferric pyrophosphate, 0.27 part reduced by boiling with sodium pyrophosphate and levulose. The cumene hydroperoxide content was varied and the mole ratio of cumene hydroperoxide to iron was calculated. The iron content of the soluble ferric pyrophosphate employed was 11.2 per cent by analysis.

SERIES I.—OLD PROCEDURE WITH 0.15 PART FERROUS SULFATE

| Cumene hydroperoxide | Mole ratio ROOH/Fe" | Per Cent conversions at— | | |
|---|---|---|---|---|
| | | 2.5 hrs. | 5.0 hrs. | 7.0 hrs. |
| 0.10 | 0.73 | 0 | 0 | 0 |
| 0.17 | 1.24 | 23 | 48 | 63 |
| 0.23 | 1.67 | 24 | 47 | 63 |

SERIES II.—REDUCED FERRIC PYROPHOSPHATE ACTIVATOR

| 0.10 | 0.73 | 51 | 61 | 61 |
|---|---|---|---|---|
| 0.17 | 1.24 | 51 | 78 | 82 |
| 0.23 | 1.67 | 49 | 75 | 82 |

Attention is directed to the high conversions obtained with the reduced ferric pyrophosphate activator and to the high initial rate of polymerization observed at a mole ratio of cumene hydroperoxide to iron salt of less than one as compared with similar results obtained with ferrous pyrophosphate activation.

As will be evident to those skilled in the art, various modifications of this invention can be made, or followed, in the light of the foregoing disclosure and discussion, without departing from the spirit or scope of the disclosure or from the scope of the claims.

I claim:

1. In the production of synthetic rubber by the polymerization in an aqueous emulsion of a monomeric material comprising a major amount of a polymerizable 1,3-diolefin and a minor amount of an unsaturated organic compound copolymerizable therewith in aqueous emulsion, said polymerization being conducted in the presence of a redox composition comprising an oxidant, a reductant, and an iron pyrophosphate catalyst therefor, the improvement which comprises employing as said oxidant a peroxide material and as said reductant and iron pyrophosphate an aqueous solution prepared by dissolving in water sodium pyrophosphate, a soluble ferric pyrophosphate, and a reducing sugar, heating said solution to its boiling point at atmospheric pressure and boiling same for a period of about 5 to about 60 minutes, and subsequently incorporating the resulting solution in said polymerization in an amount that, per 100 parts of monomeric material, the added solution contains about 0.1 to about 0.35 part of ferric pyrophosphate, about 0.5 to about 3 parts of sodium pyrophosphate, and about 1 to about 4 parts of said reducing sugar.

2. In the production of a polymeric material of high molecular weight by the polymerization in an aqueous emulsion of a monomeric material comprising a major amount of a polymerizable 1,3-diolefin and a minor amount of an unsaturated organic compound copolymerizable therewith in aqueous emulsion, said polymerization being conducted in the presence of a redox composition comprising an oxidant, a reductant, and an iron pyrophosphate catalyst therefor, the improvement which comprises employing as said oxidant a peroxide material and as said reductant and iron pyrophosphate an aqueous solution prepared by dissolving in water a pyrophosphate of an alkali metal, a soluble ferric pyrophosphate, and a reducing sugar, heating said solution in the absence of an oxidizing atmosphere to an elevated temperature for a time sufficient to effect a stabilization, and subsequently incorporating the resulting solution in said polymerization in an amount that, per 100 parts of monomeric material, the added solution contains about 0.1 to about 0.35 part of ferric pyrophosphate, about 0.5 to about 3 parts of alkali metal pyrophosphate, and about 1 to about 4 parts of said reducing sugar.

3. The process of claim 2 wherein said monomeric material comprises a major amount of 1,3-butadiene and a minor amount of styrene.

4. The process of claim 2 wherein said solution is heated to its boiling temperature and boiled for about 15 to about 60 minutes.

5. As a composition of matter, an aqueous solution prepared by dissolving in water about 0.5 to about 3 parts of sodium pyrophosphate, about 0.1 to about 0.35 part of soluble ferric pyrophosphate, and about 1 to about 4 parts of a reducing sugar, heating said solution to its boiling point at atmospheric pressure, and boiling said solution for a period of about 5 to about 60 minutes in the absence of an oxidizing atmosphere.

6. In the catalytic polymerization of a liquid monomeric material comprising 72 parts by weight of butadiene-1,3 and 28 parts by weight of styrene while dispersed in an aqueous emulsion to produce synthetic rubber, in which a redox polymerization catalyst is used comprising phenyl (dimethyl) hydroperoxymethane as the oxidant, the improvement which comprises using as an activator solution, containing the oxidation catalyst and reductant of said redox catalyst, an aqueous solution prepared by dissolving in water soluble ferric pyrophosphate, sodium pyrophosphate and a reducing sugar, boiling said solution out of contact with an oxidizing atmosphere for 15 to 30 minutes, and incorporating the resulting activator solution in said aqueous emulsion along with phenyl (dimethyl) hydroperoxymethane in such amounts that there is added, based upon 100 parts by weight of said monomeric material, 0.10 to 0.35 part of ferric pyrophosphate, 0.5 to 3 parts of sodium pyrophosphate, and 1 to 4 parts of reducing sugar, and a stoichiometric excess of phenyl (dimethyl) hydroperoxymethane over said ferric pyrophosphate.

7. In the catalytic polymerization of a liquid monomeric material comprising a major portion by weight of butadiene-1,3 and a minor portion by weight of styrene while dispersed in an aqueous emulsion to produce synthetic rubber, in which a redox polymerization catalyst is used comprising phenyl (dimethyl) hydroperoxymethane as the oxidant, the improvement which comprises using as an activator solution, containing the oxidation catalyst and reductant of said redox catalyst, an aqueous solution prepared by dissolving in water a soluble iron salt, an alkali metal pyrophosphate and a reducing sugar, boiling said solution out of contact with an oxidizing atmosphere for 5 to 60 minutes, and incorporating the resulting activator solution in said aqueous emulsion along with phenyl (dimethyl) hydroperoxymethane in such amounts that there is added, based upon 100 parts by weight of said monomeric material, 0.10 to 1 part of resulting iron pyrophosphate, 0.5 to 3 parts of excess alkali metal pyrophosphate, and 1 to 4 parts of reducing sugar.

8. The method of preparing a stable aqueous solution containing a soluble iron pyrophosphate, sodium pyrophosphate, and a reducing sugar, which comprises dissolving said components in water in the relative amounts of 0.10 to 0.35 parts of ferric pyrophosphate, 0.5 to 3 parts of sodium pyrophosphate, and 1 to 4 parts of such a sugar, and boiling said solution out of contact with an oxidizing atmosphere for 15 to 30 minutes.

9. The method of preparing a stable aqueous solution containing soluble iron pyrophosphate, an alkali metal pyrophosphate, and a reducing sugar, which comprises dissolving in water a soluble iron salt and an alkali metal pyrophosphate in proportions to produce 0.10 to 1 part of resulting iron pyrophosphate and 0.5 to 3 parts of excess alkali metal pyrophosphate, dissolving also therein 1 to 4 parts of a reducing sugar, and boiling a resulting solution for 5 to 60 minutes out of contact with an oxidizing atmosphere.

10. In the production of a polymeric material of high molecular weight by polymerization in an aqueous emulsion of a monomeric material comprising a polymerizable conjugated diolefin, said polymerization being conducted in the presence of a peroxide material, a reductant, and an iron pyrophosphate catalyst, the improvement which comprises adding reductant and iron pyrophosphate to said reaction mixture as components of an aqueous solution prepared by dissolving in water a pyrophosphate of an alkali metal and a soluble iron salt, in proportions to produce 0.1 to 1 part by weight of resulting iron pyrophosphate and 0.5 to 3 parts by weight of excess pyrophosphate of an alkali metal, and 1 to 4 parts by weight of a reducing sugar, heating said solution to an elevated temperature in the absence of direct contact with air and for a time sufficient to effect a stabilization of said solution, and subsequently incorporating a resulting solution in said polymerization in an amount that, per 100 parts of monomeric material, there is added 0.1 to 1 part of iron pyrophosphate, 0.5 to 3 parts of alkali metal pyrophosphate, and 1 to 4 parts of reducing sugar.

11. A process for the production of a polymeric material of high molecular weight, which comprises polymerizing while dispersed in an aqueous medium a monomeric material comprising an unsaturated organic compound, containing an active $CH_2=C<$ group and polymerizable in dispersion in an aqueous medium, in the presence of a polymerization catalyst composition comprising a peroxide compound together with an aqueous composition prepared by dissolving in water a pyrophosphate of an alkali metal and a soluble iron salt and a reducing sugar and heating said solution to an elevated temperature in the absence of an oxidizing atmosphere for a time sufficient to effect a stabilization of said solution, said solution being so prepared and used in an amount such that, per 100 parts by weight of said monomeric material, there is added 0.1 to 1 part of iron pyrophosphate, 0.5 to 3 parts of alkali metal pyrophosphate, and 1 to 4 parts of reducing sugar.

12. The process of claim 11 in which said monomeric material comprises a major amount of a conjugated diene having four to six carbon atoms per molecule, said alkali metal is sodium, and said heating is at the boiling point of said solution for a period of 5 to 60 minutes.

13. The process of claim 12 in which said monomeric material comprises a major amount of 1,3-butadiene and a minor amount of styrene.

14. As a composition of matter, an aqueous solution prepared by dissolving in water a pyrophosphate of an alkali metal and a soluble iron salt in proportions to produce 0.1 to 1 part by weight of resulting iron pyrophosphate and 0.5 to 3 parts by weight of excess pyrophosphate of an alkali metal, and 1 to 4 parts by weight of a reducing sugar, and heating said solution to an elevated temperature in the absence of an oxidizing atmosphere for a time sufficient to effect a stabilization of said solution.

CHARLES F. FRYLING.

REFERENCES CITED

The following references are of record in the file of this patent:

UNITED STATES PATENTS

| Number | Name | Date |
| --- | --- | --- |
| 1,215,335 | Bosch et al. | Feb. 13, 1917 |
| 2,357,069 | Barachman | Aug. 29, 1944 |
| 2,380,473 | Stewart | July 31, 1945 |
| 2,380,476 | Stewart | July 31, 1945 |
| 2,430,590 | Stewart | Nov. 11, 1947 |

OTHER REFERENCES

Merck's Index, 4th ed., published by Merck & Co. (1930), pages 281, 284, 285.